United States Patent [19]
Kalsbeck et al.

[11] 3,922,036
[45] Nov. 25, 1975

[54] BALE TRANSFER AND FEEDER

[76] Inventors: Marvin L. Kalsbeck, 105-1st St., North; Glendon P. Kurkela, R.R. No. 1, Box 45, both of, Estelline, S. Dak. 57234

[22] Filed: July 25, 1974

[21] Appl. No.: 491,946

[52] U.S. Cl. .................... 298/18; 296/8; 280/180; 298/22 P
[51] Int. Cl.² ............................................ B60P 1/16
[58] Field of Search .......... 298/22 R, 22 P, 18, 1 R; 296/6, 8; 280/180; 214/501

[56] References Cited
UNITED STATES PATENTS

| | | | |
|---|---|---|---|
| 309,990 | 12/1884 | Stagg | 296/8 X |
| 558,003 | 4/1896 | Steeck | 296/6 X |
| 994,207 | 6/1911 | Snavely | 296/8 |
| 2,286,416 | 6/1942 | Holmstrom | 298/18 X |

FOREIGN PATENTS OR APPLICATIONS

| | | | |
|---|---|---|---|
| 471,586 | 2/1951 | Canada | 298/22 |
| 57,552 | 4/1940 | Denmark | 298/18 |

*Primary Examiner*—Frank E. Werner
*Attorney, Agent, or Firm*—Clarence A. O'Brien; Harvey B. Jacobson

[57] ABSTRACT

Relatively large bales of material or feed carried on a bed supported by brackets on the transverse wheel axles of an elongated trailer frame. The bed may be laterally tilted for unloading purposes by power operated, fluid piston devices. A cross-sectional trapezoidal feed rack may be secured to the trailer mounted bed.

5 Claims, 10 Drawing Figures

U.S. Patent   Nov. 25, 1975   Sheet 1 of 3   3,922,036
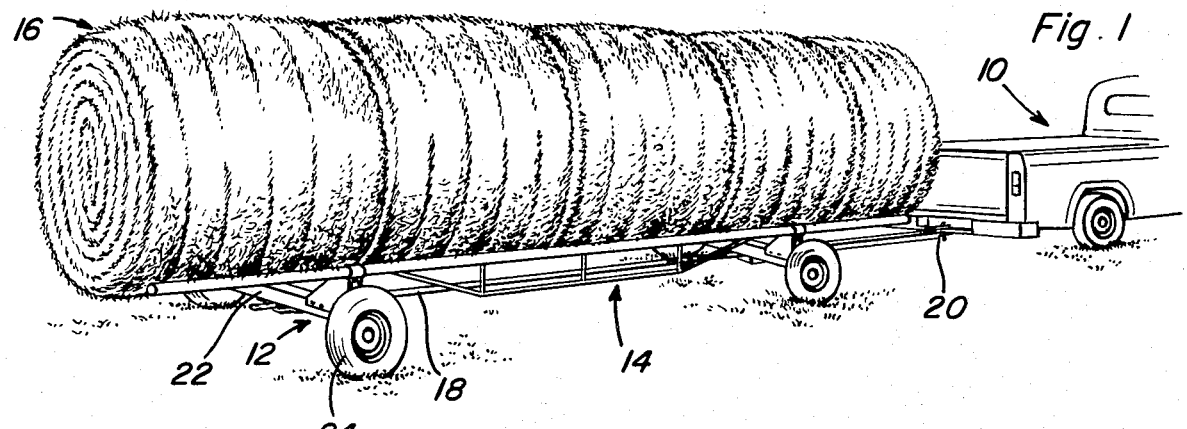
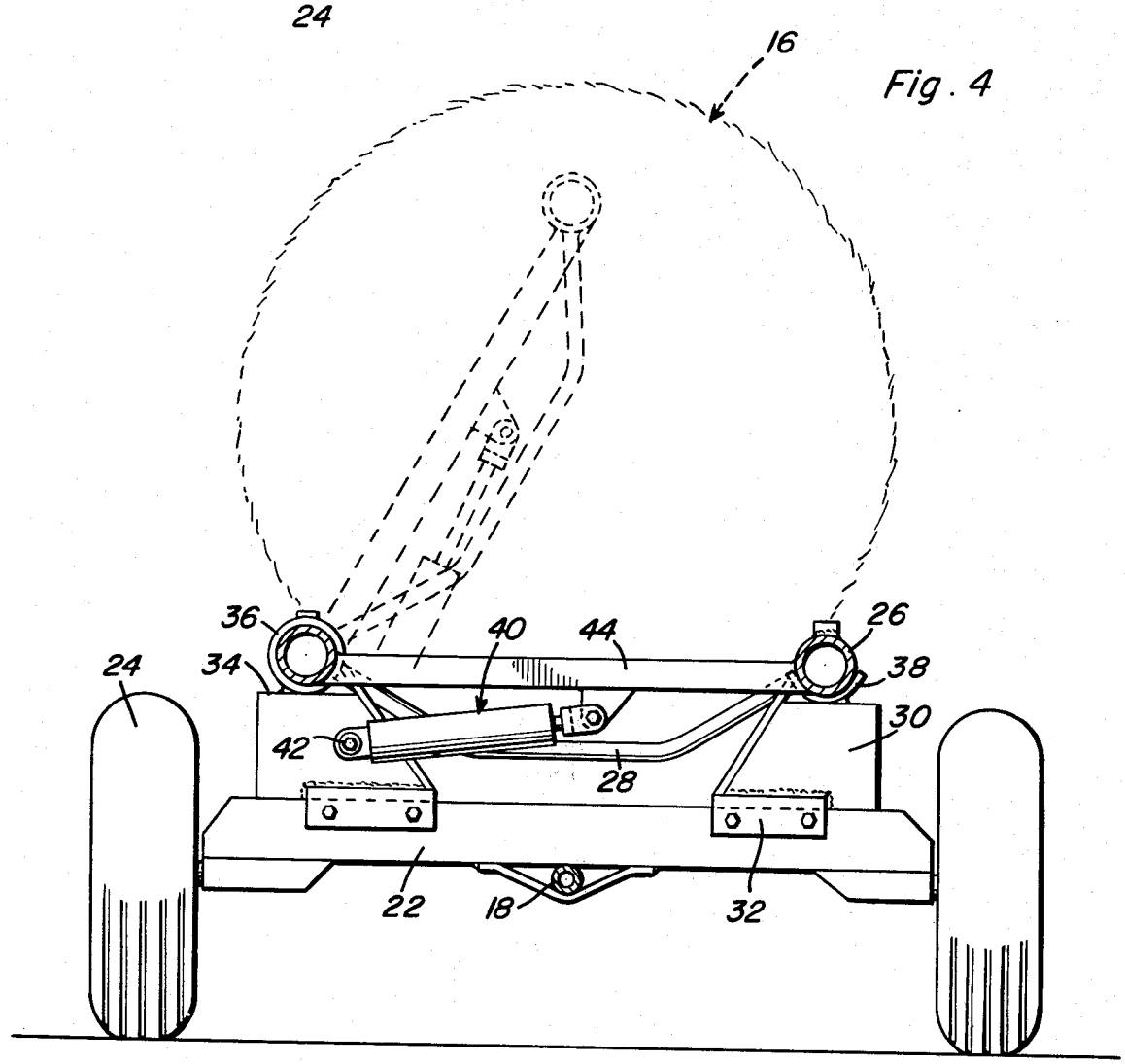
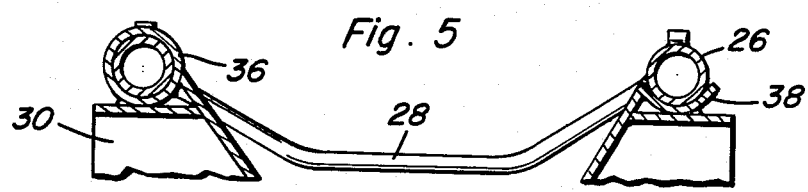

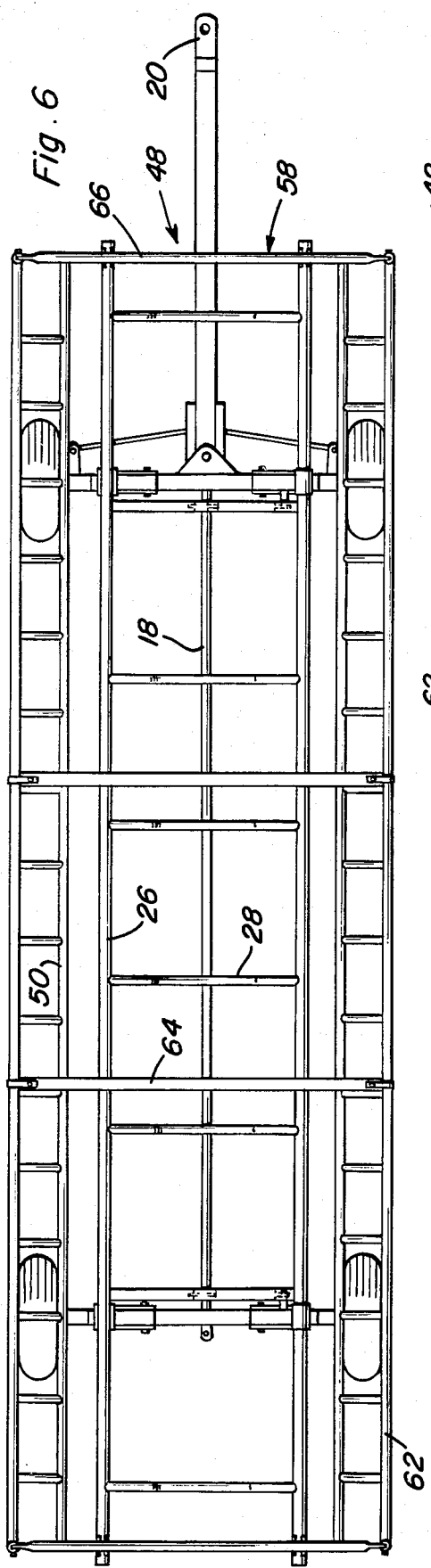
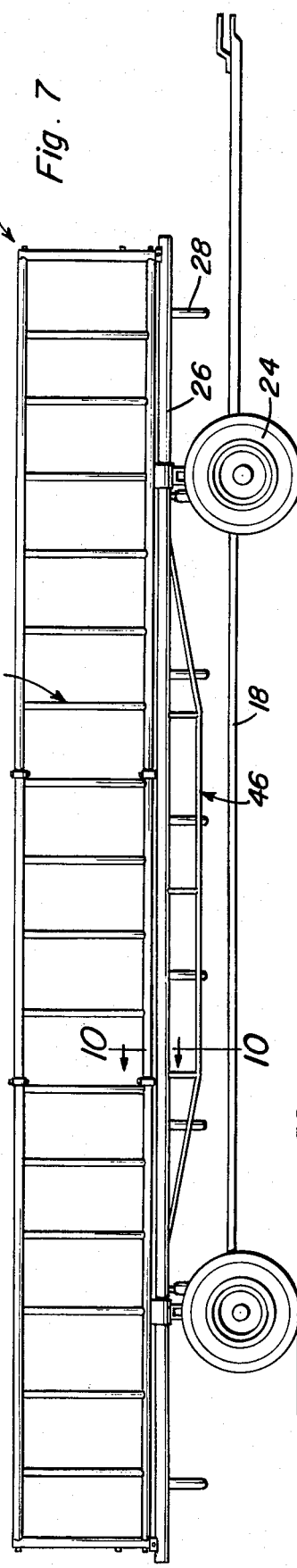
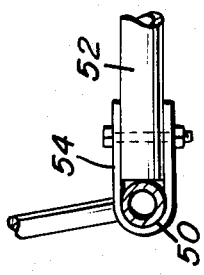
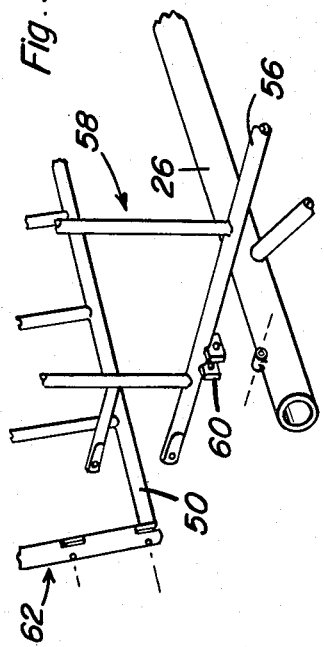
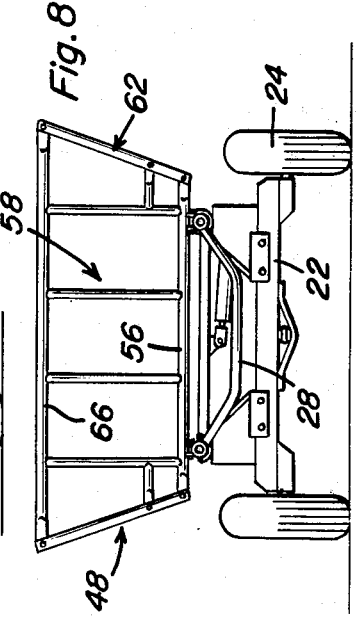

BALE TRANSFER AND FEEDER

This invention relates to the handling of agricultural material in bale form for cattle feed and more particularly to vehicle transfer and unloading of such materials.

The transfer and unloading of bales of material by vehicle mounted apparatus, is well known. Examples of such apparatus are shown in U.S. Pat. Nos. 492,709, 708,928, 1,204,372, 2,286,416, 2,739,836, 2,745,562, 3,091,498, 3,205,011 and 3,478,898.

The foregoing examples of prior art apparatus are not specifically suitable for the purposes of the present invention in the transfer and hauling of relatively large bales of hay or straw such as 1500 or 3000 pound bales. Such bales of material are to be transported and gravity unloaded or brought to a livestock farm for cattle feeding purposes. It is therefore an important object of the present invention to provide apparatus which may be easily mounted on any elongated vehicle trailer having standard running gears and adapted to be towed by either a tractor or pickup. Conventional truck or gooseneck trailers may accordingly be utilized.

In accordance with the present invention, an elongated load supporting bed is mounted on the frame of a vehicle trailer by means of brackets secured to the transverse trailer axles. The load supporting bed is formed by a pair of parallel spaced frame members supported above the trailer wheels by the brackets. Downwardly depending cross frame members interconnect the elongated pipe frame members to form the bed. A cattle feed rack of trapezoidal transverse cross section may be mounted on the load supporting bed while pivot assemblies may connect one of the elongated pipe frame members of the bed to the support brackets on one side of the longitudinal axis of the trailer frame in order to accommodate lateral tilting of the bed by power operated piston devices anchored to the supporting brackets.

These together with other objects and advantages which will become subsequently apparent reside in the details of construction and operation as more fully hereinafter described and claimed, reference being had to the accompanying drawings forming a pair hereof, wherein like numerals refer to like parts throughout.

FIG. 1 is a perspective view showing a hitch trailer equipped with loaded load bale transfer apparatus in accordance with the present invention.

FIG. 4 is an enlarged transverse sectional view taken substantially through a plane indicated by section line 4—4 in FIG. 3.

FIG. 5 is an enlarged partial sectional view taken substantially through a plane indicated by section line 5—5 in FIG. 3.

FIG. 6 is a top plan view of a trailer mounted, bale transfer device with feed rack installed thereon.

FIG. 7 is a side elevational view of the assembly shown in FIG. 6.

FIG. 8 is a front elevational view of the assembly shown in FIGS. 6 or 7.

FIG. 9 is a partial perspective view of disassembled portions of the feed rack shown in FIGS. 6, 7 and 8.

FIG. 10 is an enlarged partial sectional view taken substantially through a plane indicated by section line 10—10 in FIG. 7.

Figure 2:
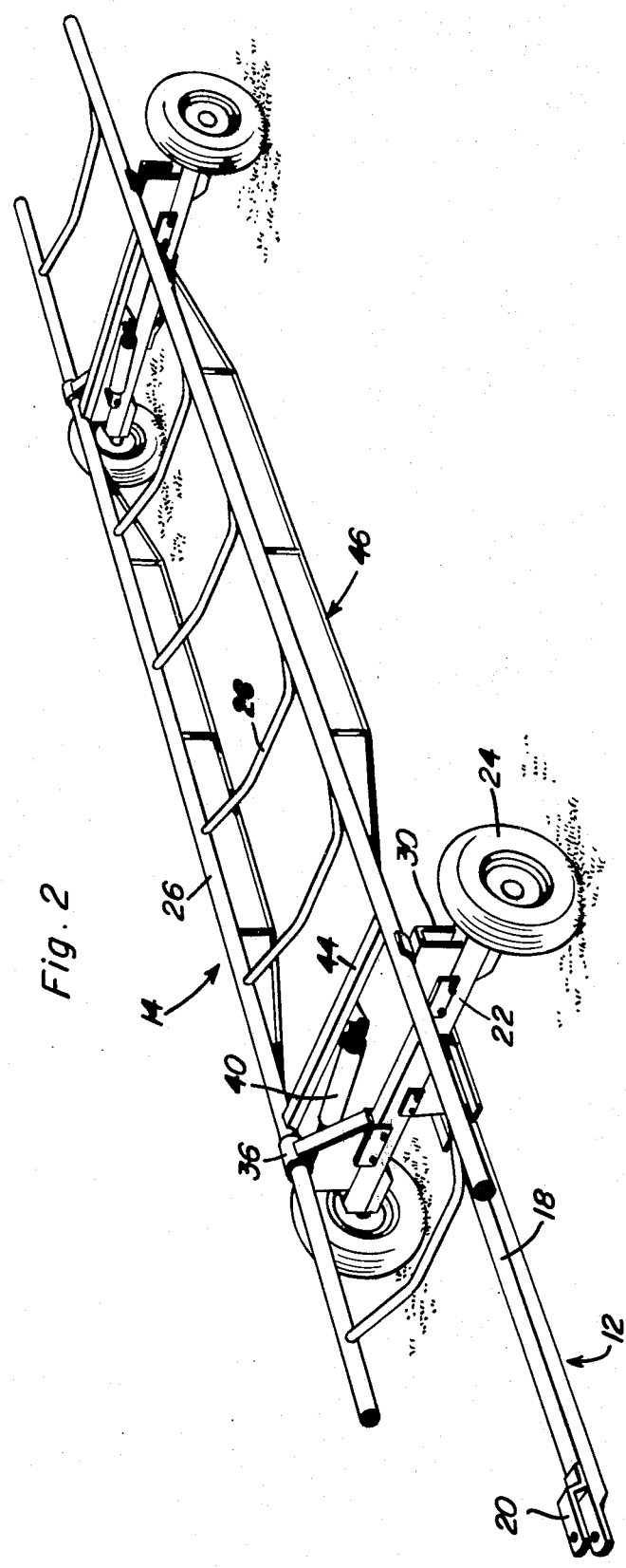
FIG. 2 is a perspective view showing the trailer mounted bale transfer device unloaded.
Figure 3:
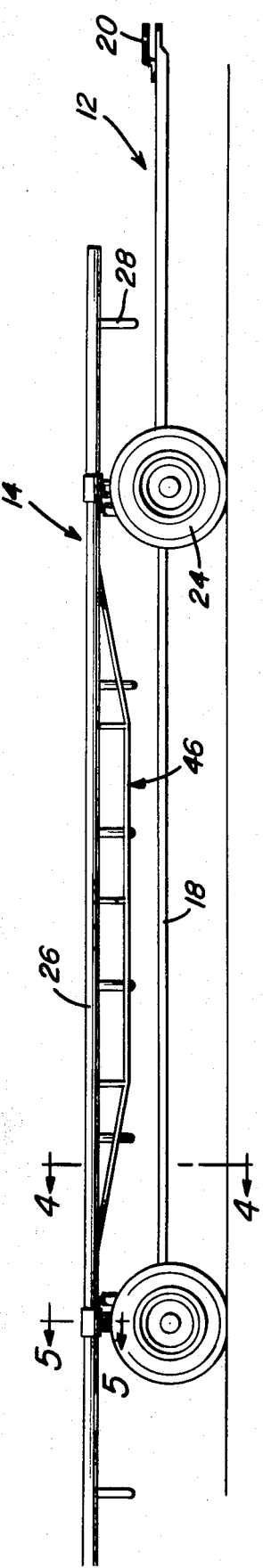
FIG. 3 is a side elevational view illustrating the assembly shown in FIG. 2.

Referring now to the drawings in detail, FIG. 1 illustrates a towing vehicle in the form of a pickup truck 10 hitched to an elongated trailer 12 on which a bale transfer apparatus 14 is mounted for hauling a number of bales 16 loaded on the apparatus 14. The trailer 12 as more clearly seen in FIGS. 2 and 3, includes a longitudinal trailer frame 18 having a hitch coupling 20 at its forward end for connection to the towing vehicle. Two transverse axles 22 are connected to the trailer frame and rotatably mount at the lateral ends thereof the vehicle wheels 24.

The bale transfer device 14 mounted on the trailer 12 is in the form of an elongated, load supporting bed formed by a pair of parallel spaced pipe frame members 26 interconnected by a plurality of longitudinally spaced cross frame members 28 that depend below the plane intersecting the longitudinal axes of the pipe frame members 26. The pipe frame members of the load supporting bed are supported by brackets 30 secured to the transverse axles 22.

A pair of brackets 30 are secured to each of the axles 22 adjacent to the wheels 24 by means of connecting flanges 32 as more clearly seen in FIG. 4. Each bracket 30 rises above the axle and presents an upper, horizontal support surface 34 on which one of the pipe frame members 26 is positioned. The brackets 30 on one lateral side of the longitudinal axis of the trailer frame are provided with pivot sleeves 36 through which one of the pipe frame members 26 is pivotally connected to the trailer frame. The other of the pipe frame members 26 on the other lateral side of the longitudinal axis of the trailer frame is positioned on the other brackets 30 by means of an arcuate rest element 38. Thus, the load supporting bed formed by the pipe frame elements 26 and the interconnecting cross frame members 28, may be pivotally displaced from a horizontal position as shown by solid line in FIG. 4 to a laterally tilted position on one side of the longitudinal axis of the trailer frame as shown by dotted line in FIG. 4.

In order to effect lateral tilting of the load supporting bed for gravitational unloading of the bales carried thereon, a pair of power operated piston devices 40 are provided. Each piston device 40 is pivotally anchored at 42 to one of the brackets 30 while its piston rod is pivotally connected to the load supporting bed by a straight transverse bar 44 interconnecting the pipe frame members 26 adjacent to the axle 22. The piston devices are connected to a valve controlled source of fluid pressure in a manner well known to those skilled in the art whereby simultaneous extension of the piston rods will effect upward pivotal displacement of the load supporting bed for gravitational unloading purposes as aforementioned.

In order to resist bending of the load supporting bed by the load carried thereon, each of the pipe frame members 26 has connected thereto and depending therefrom a truss assembly 46. Further, a feed rack generally referred to by reference numeral 48 may be mounted on the load supporting bed as shown in FIGS. 6, 7 and 8. The feed rack 48 is formed by a pair of parallel spaced, longitudinal rods 50 interconnected by at least two intermediate bottom rods 52 through U-shaped connecting straps 54 as more clearly seen in FIG. 10. The longitudinal rods 50 are furthermore interconnected in parallel spaced relationship to each other at the opposite longitudinal ends by the lower rods 56 of endgates 58, the rods 56 being pivotally connected by pivot brackets 60 to the pipe frame members 26 of the load supporting bed as more clearly seen in FIG. 9. The endgate assemblies 58 also interconnect the lateral fence assemblies 62 that are connected to and rise upwardly in diverging relationship to each other from the longitudinal rods 50. The lateral fence assemblies 62 are also interconnected at the top by crossbars 64 and end bars 66 forming part of the endgate assemblies 58 as more clearly seen in FIG. 6. Thus, when loaded with feed material, the feed rack may be hauled to a livestock farm feed yard by use of its trailer mounted bed for cattle feeding purposes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an elongated trailer having a longitudinal frame connected to at least two transverse axles rotatably mounting vehicle wheels, a bale transfer device comprising support brackets secured to each of said axles adjacent to the wheels having horizontal support surfaces vertically spaced above said axles, a load supporting bed including a pair of elongated frame members positioned on said support surfaces and a plurality of cross frame members interconnecting the elongated frame members and depending therefrom below the support surfaces at longitudinally spaced locations, means pivotally connecting one of the elongated frame members to the brackets on one lateral side of the longitudinal trailer frame, rest means secured to the support surfaces on the other lateral side of the trailer frame for receiving the other of the elongated frame members, and power operated means interconnected between the brackets on said one lateral side of the trailer frame and the elongated frame members for upward pivotal displacement of the frame members toward said one lateral side of the trailer frame, a truss assembly secured to each of said elongated frame members and depending therefrom between the axles to resist bending, and a feed retaining rack secured to the frame members and extending laterally and vertically thereabove.

2. The combination of claim 1 wherein said feed retaining rack comprises a plurality of bottom rods secured to the elongated frame members, a pair of longitudinal rods interconnecting the bottom rods in laterally spaced relation to the frame members, and a pair of fence assemblies connected to said longitudinal rods extending upwardly therefrom in diverging relation to each other.

3. In combination with an elongated trailer having a longitudinal frame connected to at least two traverse axles rotatably mounting vehicle wheels, a bale transfer device comprising support brackets secured to each of said axles adjacent to the wheels having horizontal support surfaces vertically spaced above said axles, a load supporting bed including a pair of elongated frame members positioned on said support surfaces and a plurality of cross frame members interconnecting the elongated frame members and depending therefrom below the support surfaces at longitudinally spaced locations, means pivotally connecting one of the elongated frame members to the brackets on one lateral side of the longitudinal trailer frame, rest means secured to the support surfaces on the other lateral side of the trailer frame for receiving the other of the elongated frame members, and power operated means interconnected between the brackets on said one lateral side of the trailer frame and the elongated frame members for upward pivotal displacement of the frame members toward said one lateral side of the trailer frame, and a feed retaining rack secured to the frame members and extending laterally and vertically thereabove.

4. The combination of claim 3 wherein said feed retaining rack comprises a plurality of bottom rods secured to the elongated frame members, a pair of longitudinal rods interconnecting the bottom rods in laterally spaced relation to the frame members, and a pair of fence assemblies connected to said longitudinal rods extending upwardly therefrom in diverging relation to each other.

5. In combination with an elongated trailer having a longitudinal frame connected to at least two transverse axles rotatably mounting vehicle wheels, support brackets secured to each of said axles adjacent to the wheels having horizontal support surfaces vertically spaced above said axles, a load supporting bed including a pair of elongated frame members positioned on said support surfaces, and a feed retaining rack including a plurality of bottom rods secured to the elongated frame members, a pair of longitudinal rods interconnecting the bottom rods in laterally spaced relation to the frame members, and a pair of fence assemblies connected to said longitudinal rods extending upwardly therefrom in diverging relation to each other, and means pivotally connecting the one of the elongated frame members to the bracket and power operated means interconnected between said brackets and the load supporting bed for laterally displacing the feed retaining rack.

* * * * *